Figure 1:
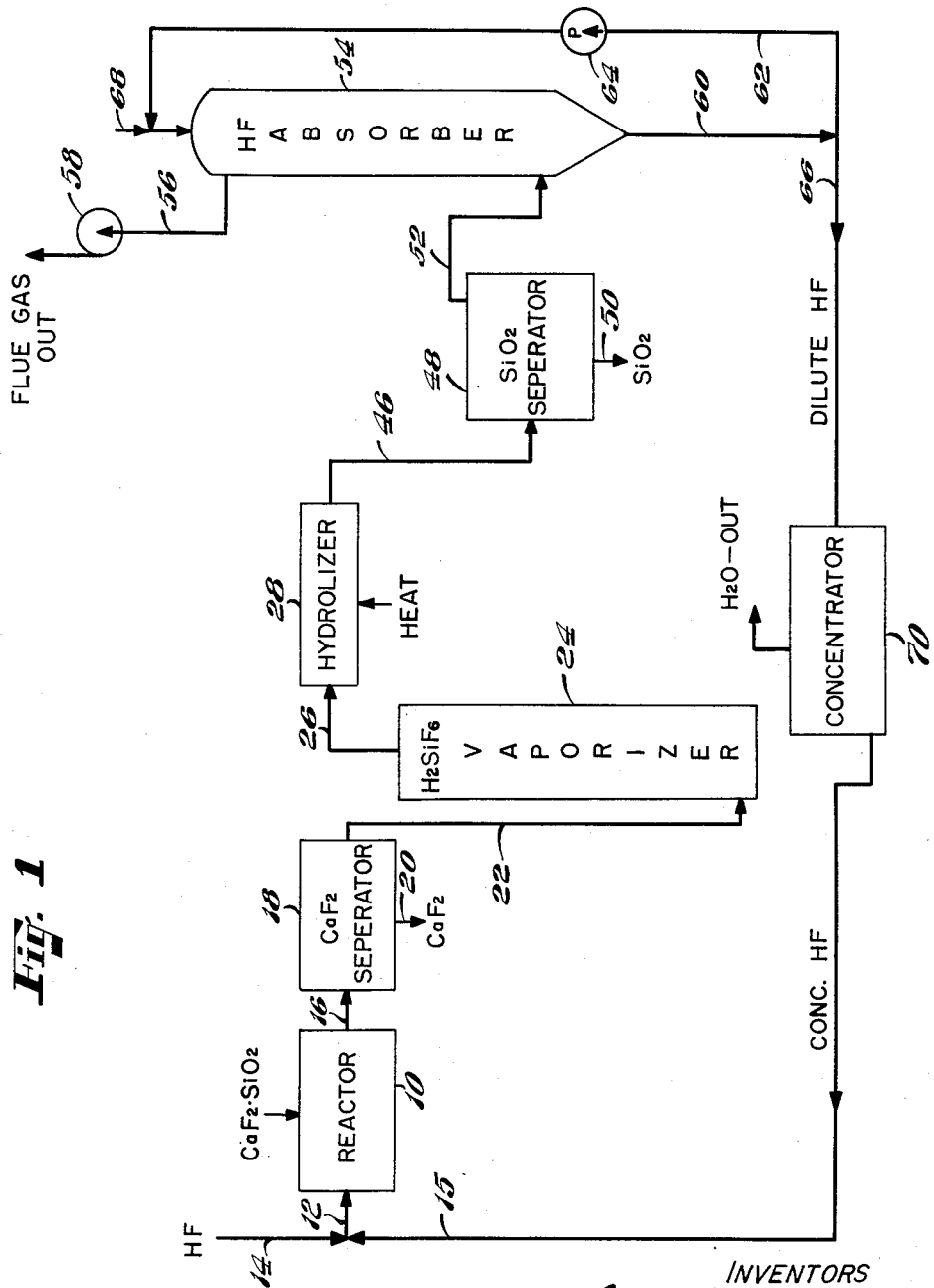

March 10, 1953 G. E. ENGELSON ET AL 2,631,083
PRODUCTION OF CALCIUM FLUORIDE AND SILICA
Filed Jan. 19, 1952 4 Sheets-Sheet 1

INVENTORS
George E. Engelson &
Robert N. Secord.
by Rumsey, Janney, Witter & Hildreth.
attys.

March 10, 1953  G. E. ENGELSON ET AL  2,631,083
PRODUCTION OF CALCIUM FLUORIDE AND SILICA
Filed Jan. 19, 1952  4 Sheets-Sheet 2

Patented Mar. 10, 1953

2,631,083

UNITED STATES PATENT OFFICE 2,631,083

PRODUCTION OF CALCIUM FLUORIDE AND SILICA

George E. Engelson, Kenberma, and Robert N. Secord, North Reading, Mass., assignors to Godfrey L. Cabot, Inc., Boston, Mass., a corporation of Massachusetts Application January 19, 1952, Serial No. 267,254

15 Claims. (Cl. 23—88)

This invention relates to a process for producing high purity calcium fluoride and silica from siliceous fluorspar.

Fluorspar is a common mineral occurring naturally in many parts of the world. However, it is not extensively found as essentially pure calcium fluoride, but is usually contaminated by other materials, notably by siliceous materials. The value of deposited fluorspar varies considerably with its degree of contamination. Fluorspars having high $CaF_2$ and low $SiO_2$ content are the most valuable. For commercial use siliceous fluorspar can not contain more than about 12% silica; and when used as a raw material for the production of hydrofluoric acid, the fluorspar can not contain less than 97% $CaF_2$ nor more than 1.5% $SiO_2$. A large proportion of the siliceous fluorspar deposits in the world fall below the present minimum standard of purity.

When fluorspar contains more than about 12% silica it has heretofore been impracticable to make use of its fluorine in most applications. This is due to the fact that 4 molecules of fluorine react with each molecule of silica to form silicon tetrafluoride thereby making most of the fluorine unavailable for effective use in conventional operations. In extraction processes either the resulting $SiF_4$ escapes as gas, or, when water is present, fluosilicic acid ($H_2SiF_6$) is formed.

As a measure of its utility fluorspar is classified according to its "effective units" of calcium fluoride. These units are determined by subtracting from the weight of the fluorspar 2.6 times the weight (calculated as percentage of the total) of its silica content. Thus, the so-called "acid" grade from which hydrogen fluoride is produced must consist of 93 effective units, (97% $CaF_2$), the ceramic grade of 87 effective units and the lowest, or metallurgical, grade of 60 effective units.

While it has long been known that siliceous fluorspar could be stripped of its silica content by treating the mineral with hydrofluoric acid, heretofore such a process has been manifestly impracticable, since an equivalent amount of hydrofluoric acid is consumed and no net gain of fluorine is achieved. Prior to our invention, so far as we are aware, no practicable process has been devised whereby to remove the silica from siliceous fluorspar economically. It is the principal object of our invention to provide such a process.

It is also an object of our invention to provide a continuous process in which the silica can be removed from siliceous fluorspar to produce substantially pure calcium fluoride and finely-divided silica with the consumption of but a minor proportion of HF.

It is also an object of our invention to provide a continuous process for the production of substantially pure calcium fluoride and finely-divided silica from siliceous fluorspar.

The objects of our invention are accomplished by reacting siliceous fluorspar with hydrofluoric acid whereby the silica combines with the acid to form fluosilicic acid, separating out the calcium fluoride, vaporizing the fluosilicic acid and hydrolizing its vapors to silica at high temperature and separating the silica from the HF at a temperature at which silica is substantially non-reactive with HF. The gases from the hydrolysis reaction are then scrubbed with water to free the hydrogen fluoride from other gases present and the hydrogen fluoride is recycled. Fresh HF is added to the system as needed.

It will be noted that the process is largely self-sustaining as the raw material fluorspar is fed to the reactor. Theoretically, no new hydrogen fluoride is required to be added although in practice some small loss, about 5% to 10% is unavoidable. The reactions of the process proceed in accordance with the following equations:

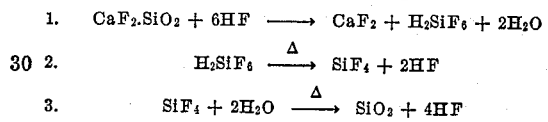

In accordance with our invention the process will proceed to completion according to the above equations when the hydrolysis of the $SiF_4$ is carried out at high temperatures and the silica product is separated from the HF at high temperatures or, if at lower temperatures, is separated from the HF before the reaction reverses and a new equilibrium is established. Under such conditions the major proportion of hydrogen fluoride utilized in the process may be recovered and recycled to react with fresh raw material siliceous fluorspar. Recycle of hydrogen fluoride is an important step in the process of our invention.

Figure 2:
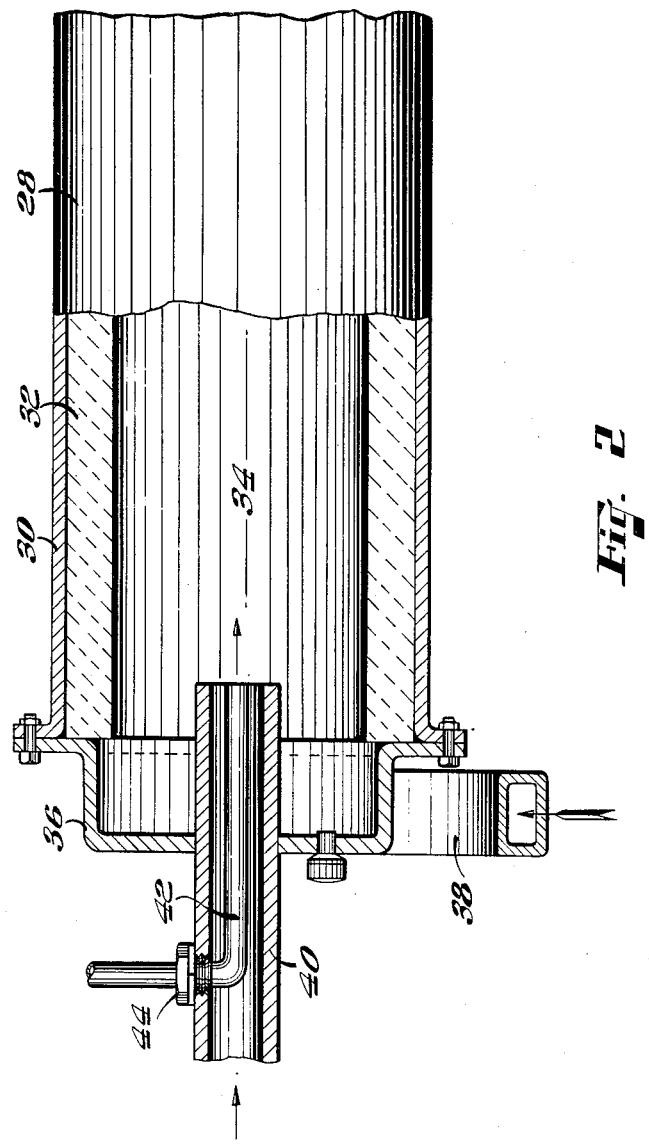
Figure 3:
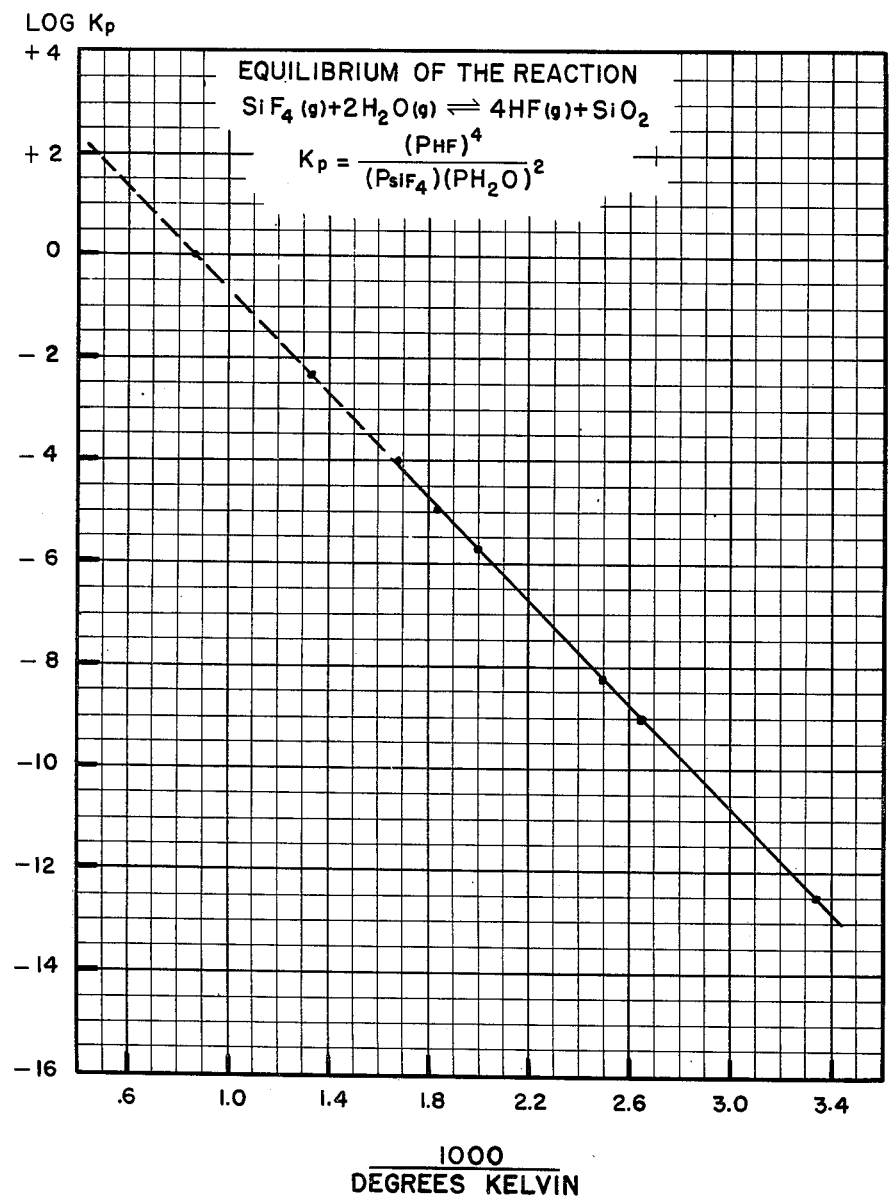
Figure 4:
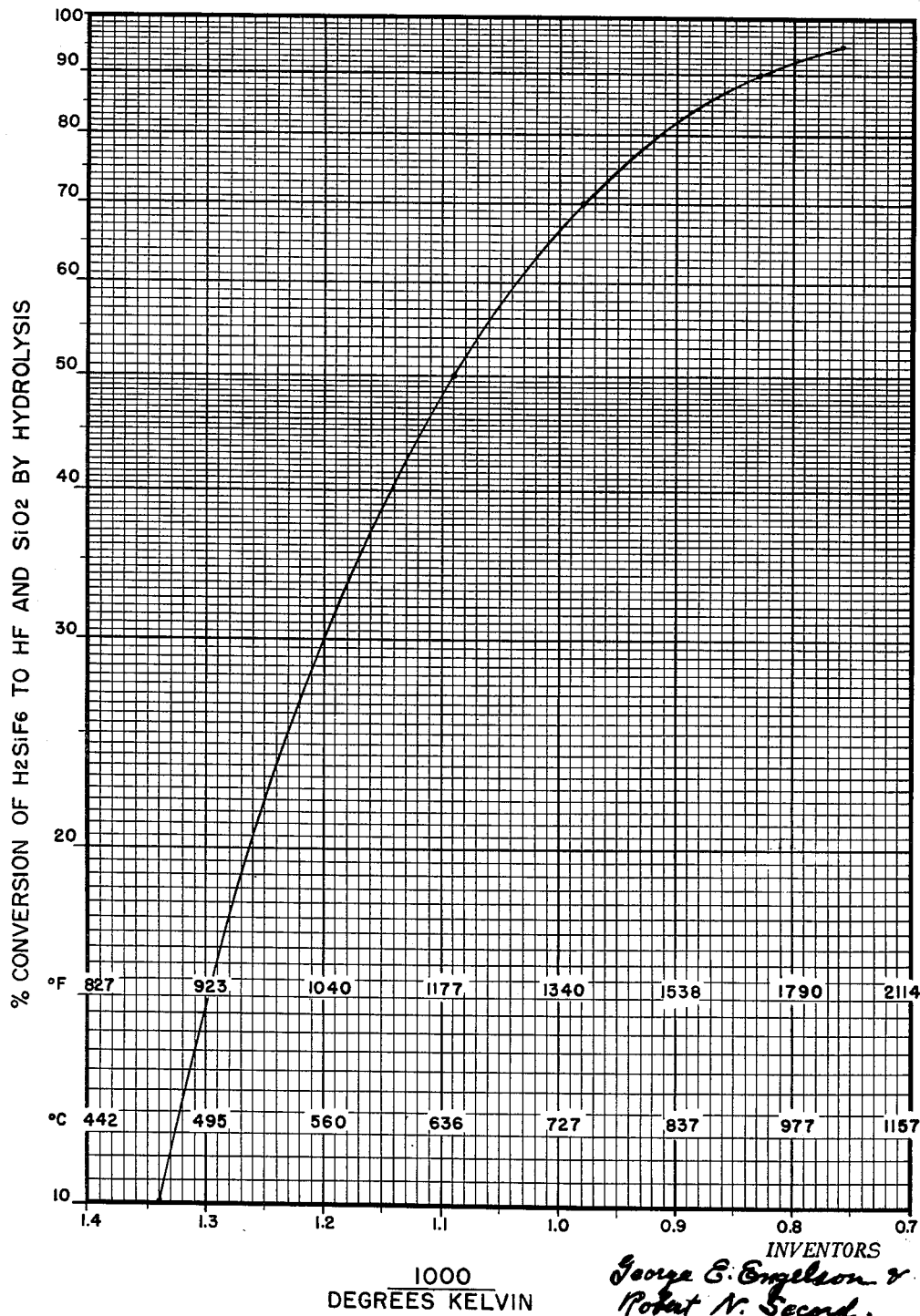

These and other features of our invention will best be understood and appreciated from the following description of a preferred manner of practicing our process taken in connection with the accompanying drawings, in which:

Figure 1 is a flowsheet of the process,

Figure 2 is a view in longitudinal section of the inlet end of a suitable form of hydrolyzing chamber, Figure 3 is a graphical representation of the log of the equilibrium constant of the reaction $SiF_4 + 2H_2O \rightarrow SiO_2 + 4HF$, against the reciprocal of the temperature (1000 divided by temperature, in degrees Kelvin), and Figure 4 is a graph of percent conversion of $H_2SiF_6$ and HF against the reciprocal of the temperature (1000 divided by temperature, in degrees Kelvin, also shown converted to temperature in degrees Fahrenheit and centigrade).

Referring to the drawings, siliceous fluorspar is introduced into a reactor 10 through an inlet 12 and contacts hydrofluoric acid which is introduced through a makeup line 14 and a recycle line 15. The hydrofluoric acid is preferably in water solution and may be of any suitable concentration. The contacting may be aided by suitable mixers (not shown) in the reactor. The siliceous constituents of the fluorspar react with the hydrofluoric acid and water present, producing hydrofluosilicic acid. Any calcium oxide or carbonate which may be present is converted to calcium fluoride. The calcium fluoride thus formed and that originally present in the fluorspar form a slurry with the water and fluosilicic acid which is present.

This slurry is conveyed through a line 16 to a separator 18, which may conveniently be a rotary filter, wherein a separation of the calcium fluoride from the liquid constituents of the slurry is accomplished. Calcium fluoride is removed from the separator through a line 20 and recovered.

The hydrofluosilicic acid freed of its $CaF_2$ content, is conveyed from the separator 18 through a conduit 22 to a suitable vaporizer 24, wherein it is heated above its boiling temperature. Upon vaporizing, hydrofluosilicic acid decomposes to silicon tetrafluoride, hydrofluoric acid and water vapor. These vapors are conveyed through line 26 to a hydrolizer 28 wherein a high temperature hydrolysis of these products is accomplished.

The hydrolizer 28 may comprise any suitable appartus for carrying out the high temperature (preferably in excess of 1100° F.) hydrolysis of the vapors issuing from vaporizer 24. One such device is shown in Figure 2.

Reactor 28, which may be of any convenient cross sectional shape but which is here shown in Figure 2 as being generally cylindrical, consists of a metal shell 30 lined with suitable refractory material 32, to form a reaction chamber 34. The inlet end of chamber 34 is enclosed by a scroll-shaped metal header 36 having a duct 38 leading tangentially thereinto.

Reactants for the hydrolysis are introduced into reactor 28 through burner 40 which consists of a metal pipe centered in and directed axially through header 36 into the reaction chamber 34. Concentrically centered in the burner tube 40 is a smaller pipe 42 which is an extension of reactant supply line 26. A packing gland 44 prevents leakage around the portion of pipe 42 passing through the side of tube 40.

A combustible gas, which may be a vaporized liquid or gaseous hydrocarbon, premixed with air, is introduced through burner pipe 40 into reaction chamber 34 where it is completely burned. Additional air which may be required to support the complete combustion of the combustible gas is furnished through the tangential duct 38.

In this stage of the process of our invention, the fluosiliceous vapors from vaporizer 24 flow into chamber 34 of reactor 28 where they are hydrolyzed in the flame from burner 40 to produce silica and hydrogen fluoride. The products of combustion and of the hydrolysis are withdrawn from the downstream end of the reactor through an insulated or heated flue pipe 46 and flow into a silica separator 48.

It is, of course, essential that the silica be removed from the presence of the hydrogen fluoride before it has had an opportunity to recombine therewith. There will be no reaction between the silica and the HF provided they are separated at sufficiently high temperatures. Consequently, the product gases are passed through the separator 48 at a temperature above about 1100° F. and preferably higher, the efficiency of separation at given temperatures being illustrated in Figure 4. While suitably constructed sonic or electric agglomerators followed by one or more cyclone separators will achieve adequate recovery of silica from the carrier gases, we have found porous ceramic filters to be particularly effective. Thus separator 48 will preferably consist of a filter chamber from which the silica may be effectively and substantially completely separated from the HF and combustion product gases and drawn off through line 50.

The gaseous products of hydrolysis are vented from the separator 48 via a line 52 through which they are conveyed to one or more conventional absorption towers 54. In accordance with the usual operation of such absorbers the gases are scrubbed with streams of water which absorb and separate the hydrogen fluoride therefrom. The cleaned gases can then be allowed to escape from the absorption tower through a line 56. A fan 58 may be provided in the line 56 to provide the necessary flow conditions through the system.

The hydrogen fluoride recovered in adsorber 54 is, of course, highly dilute. Consequently, a major portion thereof is available for recirculation through the absorber as part of the scrubbing liquid. Thus, the dilute HF withdrawn from the bottom of the scrubber through a line 60 is divided into two streams, one a recycle stream carried through a pipe 62 and a pump 64 and the other a reactant stream carried through a pipe 66. Fresh make-up water is added as needed to absorber 54 through a pipe 68.

The HF to be used for the initial reaction in reactor 10 is conveyed through pipe 66 to a concentrator 70 in which excess water is removed. This water may advantageously be used as scrubbing water. The concentrated HF is then returned to reactor 10 through line 15 to complete the process cycle.

Other suitable apparatus for accomplishing the objects of our invention will be readily apparent to those skilled in the art. For example, the hydrolysis of the fluosiliceous constituents may be accomplished in a reactor of the impingement type in lieu of the furnace shown in Fig. 2. Or it may be accomplished in an externally heated reactor in which the combustion gases are not allowed to mingle with the fluosiliceous constituents. As the fluosiliceous vapors will in any event contain sufficient water for completion of the hydrolysis reaction the additional water obtained from the combustion of hydrocarbon gases is not essential to the process. When the hydrolizer is heated externally the expense of supplying heat is greater but the HF concentration in the return line 15 can be maintained without assistance of the concentrator 70. Similarly, other types of apparatus may be employed in carrying out the process of our invention without departing from the scope of our invention.

The silica produced by the hydrolysis of the fluosiliceous constituents in reactor 28 may be similar to that produced according to the process of U. S. Letters Patent No. 2,535,036, Broughton. It is an impalpable white powder having an initial apparent density of between 3–10# per cubic foot, more or less, and a specific surface area as high as 200 square meters per gram, more or less, depending upon the temperature and rate of hydrolysis. The similarity between the silica produced by our invention and that of the Broughton invention is probably due to the fact that in both inventions the hydrolysis of the fluosiliceous constituents is carried out in the vapor phase.

However, unlike the hydrolysis of the Broughton invention the step of hydrolysis in our invention must be carried out at high temperatures, 1100° F. or more, in order to obtain the yields of hydrofluoric acid which are required to make the overall process for removing silica from siliceous fluorspar a practicable undertaking. This fact can be well established in theory as well as well as by practical experience as illustrated in the following example.

Example 1

The effluent from vaporizer 24 had a concentration of 30% $H_2SiF_6$, i. e., for each mol of $H_2SiF_6$ there were 18.7 mols of water. The hydrolysis proceeded as follows:

$$2HF + SiF_4 + 18.7H_2O \rightarrow x(SiO_2) + 4x(HF) + (18.72 - 2x)(H_2O) + (1-x)(SiF_4) + 2HF$$

where $x$ = mols of $SiO_2$ produced. The equilibrium mixture thus contained the following: $4x+2$ mols HF, $18.7-2x$ mols $H_2O$ and $1-x$ $SiF_4$, or a total of $21.7+x$ mols. At constant pressure the equilibrium of the reaction will vary with the temperature, the equilibrium constant $K_P$ being equal to

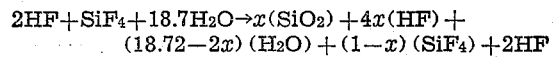

$$\frac{(pHF(g))^4}{(pSiF_4(g))(pH_2O(g))^2}$$

As experimentally determined by Ryss in Zhur. Phys. Chem. (USSR) 14, 571 (1940) the logarithm of the equilibrium constant is a straight line function of the reciprocal of the temperature. This is graphically represented in Figure 3.

From the above formula it can then readily be ascertained that at 1136° K. (1585° F.) the hydrolysis of the 30% $H_2SiF_6$ solution will proceed 86% to completion.

Figure 4 graphically illustrates the equilibrium relationship between temperature of hydrolysis and percent conversion of fluosilic acid to silicon dioxide and hydrofluoric acid. It will be apparent from this graph that the hydrolysis must be carried on at a temperature in excess of 1100° F. in order to accomplish a conversion of 50%. Since in practice, a conversion of hydrofluosilicic acid to silica and hydrofluoric acid as low as 50% is inadequate, we prefer to employ hydrolysis temperatures and, by the same token, to separate the silica from the HF at temperatures in excess of 1500° F. in order to attain a conversion of 80% or better.

There are two additional factors which affect the efficiency of the recovery process. One of these is that the flue products from the hydrolyzer do not attain an equilibrium condition as quickly as they are cooled. Accordingly, even though some cooling does occur between the hydrolyzer and silica separator the loss due to reconversion upon cooling which would be expected from the equilibrium data is seldom realized and the separation may ordinarily be accomplished at somewhat lower temperature without a corresponding loss due to reconversion. Another factor which affects the efficiency of recovery is the solubility in water of tetrafluoride. Accordingly, even if a substantial percentage of fluosilicic acid is not fully reacted to silica and hydrofluoric acid in the hydrolyzer, it will be absorbed in the scrubbing water of the absorption towers and can be recycled to reactor 10.

The beneficial effects of the process of our invention may best be illustrated by the following series of examples, which set forth the results of reacting certain fluorspar specimens in accordance with our process.

Example 2

About 15 grams of crushed silicious fluorspar containing less than 60 effective units was digested at room temperature with 110 grams of 30% aqueous hydrofluoric acid. After removal of the calcium fluoride filtrate the liquid residue was vaporized and introduced into an enclosed reactor in the center of a complete combustion hydrocarbon gas flame. The silica was recovered at a temperature in excess of 2000° F. at a yield of 90% of theoretical and the HF was scrubbed out of the reaction product gases with water, concentrated and recovered.

Example 3

The procedure outlined in Example 2 was employed for a sample of fluorospar having the following analysis:
$SiO_2 = 23.2\%$; $CaF_2 = 67.5\%$; $CaCO_3 = 1\%$; inerts $= 8.3\%$ After reaction, the solids recovered from filtration had the following analysis:
$SiO_2 = 3.19\%$; $CaF_2 = 86.3\%$; inerts $= 10.6\%$ or $86.3 - (3.19 \times 2.6) = 78.0$ effective units of $CaF_2$ In this example, it will be observed that by the process of our invention a sample of otherwise useless fluorspar has been converted to a high metallurgical grade fluorspar.

Similarly, by the process of our invention it is possible to convert an otherwise useless fluorspar to an acid grade material. An example of this is set forth below.

Example 4

Siliceous flourspar analyzing $SiO_2 = 20\%$, $CaF_2 = 79\%$ and $CaCO_3 = 1\%$, for 27 effective units of $CaF_2$, was used as the raw material in a run carried out according to the procedure of Example 2. 95% of its silica product was removed and recovered to produce a fluorspar product containing 95 effective units of calcium fluoride.

It is obvious that the fluorspar product of any given run of the process can be further treated in accordance with the process of our invention to produce essentially pure calcium fluoride. Inerts are easily removable by known techniques.

Having thus disclosed our invention and described in detail representative embodiments thereof, we claim and desire to secure by Letters Patent:

1. A process for the production of high purity calcium fluoride and silica from siliceous fluorspar which comprises the steps of reacting the fluorspar with hydrofluoric acid, removing the calcium fluoride product from the liquid reaction products, vaporizing the said liquid products and hydrolyzing the vapors thereof at elevated temperatures, removing the silica product from the gaseous hydrolysis products, separating the hydrogen fluoride from said gaseous hydrolysis products, and recycling at least a portion of the resulting hydrofluoric acid for reaction with additional siliceous fluorspar.

2. The process of claim 1 in which the hydrolysis is carried out in a hydrocarbon flame in an enclosed reaction chamber at a temperature in excess of 1100° F. and in which at least a portion of the water for the hydrolysis is produced by combustion of the hydrocarbon in an oxygen-containing gas.

3. The process of claim 1 in which the major proportion of hydrofluoric acid reacted with the siliceous fluorspar is obtained from the hydrolysis of the liquid reaction products.

4. The process of claim 1 in which the silica produced in the hydrolysis step of the process is separated from the hydrogen fluoride at a temperature above 1100° F.

5. The process of claim 1 in which the hydrofluoric acid reacted with the siliceous fluorspar is in aqueous solution.

6. The process of claim 5 in which at least a portion of the water for hydrolysis of the liquid reaction products is initially present therein.

7. A process for the production of high purity calcium fluoride and silica from siliceous fluorspar which consists in mixing with said fluorspar sufficient hydrofluoric acid to combine with substantially all of the siliceous component thereof to form fluorosilicic acid, separating the calcium fluoride from the fluosilicic acid, heating said acid to form silicon tetrafluoride and hydrogen fluoride vapors, hydrolyzing said silicon tetrafluoride at a temperature above about 1100° F. to form silica and hydrogen fluoride, separating the silica from the hydrogen fluoride at a temperature above about 1100° F. and recovering the hydrogen fluoride for reuse.

8. The process of claim 7 in which siliceous fluorspar is continuously added to the mixing zone and the recovered hydrogen fluoride is continuously recycled to the mixing zone.

9. The process of claim 7 in which the silicon tetrafluoride and water vapors are introduced longitudinally into an elongated, unobstructed reaction zone in close juxtaposition with a stream of a combustible gas and air and the said gas is burned to hydrolyze the silicon tetrafluoride to silica and hydrofluoric acid.

10. The process of claim 7 in which the siliceous fluorspar contains fewer than 60 effective units of calcium fluoride.

11. The process of claim 7 in which the hydrogen fluoride from the hydrolysis is separated from the other products thereof by sprays of water.

12. A process for the production of high grade calcium fluoride which comprises in a reaction zone treating siliceous fluorspar with hydrofluoric acid to produce calcium fluoride substantially free of silica and to produce fluosilicic acid, removing the calcium fluoride product from the process, heating the fluosilic acid to produce silicon tetrafluoride and hydrogen fluoride in vapor form, passing said vapors to a hydrolysis reaction zone, hydrolyzing the silicon tetrafluoride in said reaction zone to produce silica and hydrogen fluoride, removing the silica product from the process, separating the hydrogen fluoride from the remaining gaseous reaction product and passing it to the siliceous fluorspar treating reaction zone.

13. The process for the production of high purity calcium fluoride and silica from siliceous fluorspar comprising the steps of treating the fluorspar with aqueous hydrofluoric acid, separating undissolved calcium fluoride from the liquid reaction products, vaporizing the liquid reaction products, heating the vapors in the presence of sufficient water vapor to hydrolyze silicon-fluorine reaction products to a temperature greater than 1100° F., thereby hydrolyzing the silicon-fluorine reaction products substantially entirely to silica and hydrogen fluoride, separating the silica from the hydrogen fluoride, and recycling the hydrogen fluoride.

14. The process of the production of high purity calcium fluoride and silica from siliceous fluorspar comprising the steps of treating the fluorspar with aqueous hydrofluoric acid, separating undissolved calcium fluoride from the liquid reaction products, vaporizing the liquid reaction products, heating the vapors in the presence of sufficient water vapor to hydrolyze silicon-fluorine reaction products to a temperature greater than 1100° F., thereby hydrolyzing the silicon-fluorine reaction products substantially entirely to silica and hydrogen fluoride, separating the silica from the hydrogen fluoride, absorbing the hydrogen fluoride in water to form a dilute solution of hydrofluoric acid, concentrating at least a portion of the hydrofluoric acid and returning it to the process.

15. A process for the production of high purity calcium fluoride and silica from siliceous fluorspar which comprises the steps of reacting the fluorspar with sufficient hydrofluoric acid to combine with substantially all of the siliceous component thereof, removing the calcium fluoride product from the liquid reaction products, vaporizing the said liquid products and hydrolyzing the vapors thereof at a temperature of at least 1100° F., removing the silica product from the gaseous hydrolysis products, separating the hydrogen fluoride from said gaseous hydrolysis products, and recycling at least a portion of the resulting hydrofluoric acid for reaction with additional siliceous fluorspar.

GEORGE E. ENGELSON.
ROBERT N. SECORD.

REFERENCES CITED

The following references are of record in the file of this patent:

UNITED STATES PATENTS

| Number | Name | Date |
| --- | --- | --- |
| 2,535,036 | Broughton | Dec. 26, 1950 |

FOREIGN PATENTS

| Number | Country | Date |
| --- | --- | --- |
| 630,182 | Great Britain | Oct. 6, 1949 |

OTHER REFERENCES

"Canadian Chem. and Metallurgy," August 1937, page 271.